(12) United States Patent
Chow et al.

(10) Patent No.: US 8,513,353 B2
(45) Date of Patent: Aug. 20, 2013

US008513353B2

(54) FORMING COPOLYMER FROM BICONTINUOUS MICROEMULSION COMPRISING MONOMERS OF DIFFERENT HYDROPHILICITY

(75) Inventors: Edwin Pei Yong Chow, Singapore (SG); Jackie Y. Ying, Singapore (SG)

(73) Assignee: Agency for Science, Technology and Research, Singapore (SG)

( * ) Notice: Subject to any disclaimer, the term of this patent is extended or adjusted under 35 U.S.C. 154(b) by 0 days.

(21) Appl. No.: 13/257,570

(22) PCT Filed: Mar. 19, 2009

(86) PCT No.: PCT/SG2009/000097
§ 371 (c)(1),
(2), (4) Date: Sep. 19, 2011

(87) PCT Pub. No.: WO2010/107390
PCT Pub. Date: Sep. 23, 2010

(65) Prior Publication Data
US 2012/0035288 A1 Feb. 9, 2012

(51) Int. Cl.
*C08F 2/24* (2006.01)
(52) U.S. Cl.
USPC .......... 524/800; 524/808; 524/812; 524/832; 526/258; 526/263; 526/317.1; 526/319; 526/320; 521/65

(58) Field of Classification Search
None
See application file for complete search history.

(56) References Cited

U.S. PATENT DOCUMENTS

| | | | |
|---|---|---|---|
| 4,962,178 A | 10/1990 | Harisiades | |
| 5,151,217 A | 9/1992 | Price | |
| 5,238,992 A | 8/1993 | Outubuddin | |
| 5,244,799 A | 9/1993 | Anderson | |
| 5,521,229 A | 5/1996 | Lu et al. | |
| 5,624,973 A * | 4/1997 | Lu et al. | 522/40 |
| 5,840,338 A | 11/1998 | Roos et al. | |
| 5,994,133 A | 11/1999 | Meijs et al. | |
| 6,015,609 A | 1/2000 | Chaouk et al. | |
| 6,027,745 A | 2/2000 | Nakada et al. | |
| 6,039,913 A | 3/2000 | Hirt et al. | |
| 6,048,908 A | 4/2000 | Kitagawa | |
| 6,060,530 A | 5/2000 | Chaouk et al. | |
| 6,160,030 A | 12/2000 | Chaouk et al. | |
| 6,281,192 B1 | 8/2001 | Leahy et al. | |
| 6,410,045 B1 | 6/2002 | Schultz et al. | |
| 6,451,348 B1 | 9/2002 | Jeong et al. | |
| 6,528,465 B1 | 3/2003 | Cantoro | |
| 6,652,581 B1 | 11/2003 | Ding | |
| 7,226,972 B2 | 6/2007 | Zhao et al. | |
| 7,988,992 B2 * | 8/2011 | Omidian et al. | 424/451 |
| 2002/0020946 A1 | 2/2002 | Hiraoka et al. | |
| 2002/0149740 A1 | 10/2002 | Hopken et al. | |
| 2002/0165324 A1 | 11/2002 | Bowers et al. | |
| 2003/0008007 A1 * | 1/2003 | Gutierrez-Rocca et al. | 424/473 |
| 2003/0008154 A1 | 1/2003 | Aguado et al. | |
| 2003/0175324 A1 | 9/2003 | Robinson et al. | |
| 2004/0067301 A1 | 4/2004 | Ding | |
| 2004/0096477 A1 | 5/2004 | Chauhan et al. | |
| 2004/0258732 A1 | 12/2004 | Shikinami | |
| 2005/0148682 A1 | 7/2005 | Hu et al. | |
| 2005/0271729 A1 | 12/2005 | Wang | |
| 2006/0204555 A1 * | 9/2006 | Yang et al. | 424/443 |
| 2006/0235162 A1 | 10/2006 | Muller et al. | |
| 2007/0154522 A1 | 7/2007 | Chow et al. | |
| 2007/0293648 A1 | 12/2007 | Sheardown et al. | |
| 2010/0048755 A1 | 2/2010 | Chow et al. | |

FOREIGN PATENT DOCUMENTS

| | | |
|---|---|---|
| CN | 1488331 A | 4/2004 |
| EP | 0449450 A1 | 10/1991 |
| EP | 0430517 B1 | 4/1998 |
| EP | 0882996 A2 | 12/1998 |
| EP | 0903384 A1 | 3/1999 |
| EP | 2039424 | 3/2009 |
| JP | 63-309914 A | 12/1988 |
| JP | 06-239942 A | 8/1994 |
| JP | 7-224105 A | 8/1995 |
| JP | 2003-159321 A | 6/2003 |
| WO | WO-97/35904 A1 | 10/1997 |
| WO | WO-02/39948 A2 | 5/2002 |
| WO | WO-2005/007717 A1 | 1/2005 |
| WO | WO 2006/014138 A1 | 2/2006 |
| WO | WO-2007/085629 A2 | 8/2007 |
| WO | WO 2008/060249 A1 | 5/2008 |
| WO | WO-2010-107390 A1 | 9/2010 |

OTHER PUBLICATIONS

"Nanofiltration Membranes Prepared by Direct Microemulsion Copolymerization Using Poly(ethylene oxide) Macromonomer as a Polymerizable Surfactant" authored by Liu et al and published in the Journal of Applied Polymer Science (2000) 77, 2785-2794.*

Garrett Q. et al., Hydrogel Lens Monomer Constituents Modulate Protein Sorption. Invest Ophtalmol Vis Sci. vol. 41, No. 7, Jun. 2000, pp. 1687-1695.

International Preliminary Report on Patentability dated Feb. 25, 2010 in connection with PCT/SG2009/000097.

International Search Report and Written Opinion dated May 4, 2009 in connection with PCT/SG2009/000097.

Raj, W. R. P. et al., Polymerization of single-phase microemulsions: dependence of polymer morphology on microemulsion structure. Polymer. vol. 36, No. 13, 1995, pp. 2637-2646.

(Continued)

*Primary Examiner* — Marc Zimmer
(74) *Attorney, Agent, or Firm* — Wolf, Greenfield & Sacks, P.C.

(57) ABSTRACT

A copolymer defines interconnected pores and comprises polymerized monomers. The monomers comprise a first monomer more hydrophilic than 2-hydroxyethyl methacrylate (HEMA), and a second monomer as hydrophilic as, or less hydrophilic than, HEMA. In a method of forming a polymer, a bicontinuous microemulsion comprising water, a surfactant, and a combination of monomers copolymerizable for forming a porous copolymer is provided. The combination of monomers comprises the first and second monomers. The monomers in the bicontinuous microemulsion are polymerized to form the porous copolymer. The first monomer may comprise N-vinylpyrrolidone (NVP) or methacrylic acid (MAA). The second monomer may comprise HEMA or methyl methacrylate (MMA).

32 Claims, 4 Drawing Sheets

(56) References Cited

OTHER PUBLICATIONS

Snyder, Christopher, A Primer on Contact Lens Materials. Opticiens Perret. [Online] Feb. 2004.
European Patent Office, Extended European Search Report, dated Oct. 27, 2010, in European Application No. 07835553.4.
European Patent Office, "Summons to attend oral proceedings pursuant to Rule 115(1) EPC", Dec. 12, 2008, in European Patent Application No. 04749259.0.
Korean Patent Office, "Office Action", Aug. 24, 2010, in Korean Patent Application No. 10-2006-7027694.
Korean Patent Office, "Final Office Action", mailed May 26, 2011, in Korean Patent Application No. 10-2006-7027694.
Japanese Patent Office, "Office Action", Jan. 27, 2010, in Japanese Patent Application No. 2007-524769.
Japanese Patent Office, "Office Action", Jul. 28, 2010, in Japanese Patent Applicaiton No. 2007-524769.
Japanese Patent Office, "Decision of Final Rejection", mailed Nov. 24, 2010, in Japanese Patent Application No. 2007-524769.
Chinese Patent Office, "Office Action", Oct. 17, 2008, in Chinese Patent Application No. 200480043297.4.
Chinese Patent Office, "Office Action", Jun. 11, 2010, in Chinese Patent Application No. 200480043297.4.
International Search Report and Written Opinion, mailed Sep. 20, 2004, in PCT Application No. PCT/SG2004/000237.
Written Opinion, mailed Feb. 17, 2006, in related PCT Application No. PCT/2004/000237.
International Preliminary Report on Patentablity, mailed May 4, 2006, in PCT Application No. PCT/SG2004/000237.
International Search Report and Written Opinion, mailed Feb. 8, 2008, in PCT Application No. PCT/SG2007/000398.
International Preliminary Report on Patentability, dated Nov. 10, 2008, in PCT Application No. PCT/SG2007/000398.
Beckhardt, "Office Action", mailed Jul. 14, 2009, in U.S. Appl. No. 10/585,259.
Beckhardt, "Office Action", mailed Dec. 17, 2009, in U.S. Appl. No. 10/585,259.
Beckhardt, "Office Action", dated May 20, 2011, in U.S. Appl. No. 10/585,259.
Negrelli, "Office Action", dated Oct. 27, 2010, in U.S. Appl. No. 12/515,264.
Negrelli, "Office Action", Mar. 22, 2011, in U.S. Appl. No. 12/515,264.
Negrelli, "Office Action", Jul. 14, 2011, in U.S. Appl. No. 12/515,264.
Abbasi et al. "Modification of polysiloxane polymers for biomedical applications: A review", Polym Int, 2001, pp. 1279-1287, vol. 50.
Aucoin et al., "Interactions of corneal epithelial cells and surfaces modified with cell adhesion peptide combinations", J Biomater Sci Polym Edn, 2002, pp. 447-462, vol. 13.
Band, "Hyaluronan derivatives: chemistry and clinical applications", The Chemistry, Biology and Medical Applications of Hyaluronan and Its Derivatives, 1998, pp. 33-42, Portland Press Ltd.
Chieng et al., "Morphology of microporous polymeric materials by polymerization of methyl methacrylate and 2-hydroxyethyl methacrylate in microemulsions", Polymer, 1995, pp. 1941-1946, vol. 36, No. 10.
Chirila et al., "Artificial cornea", Prog. Polym. Sci., 1998, pp. 447-473, vol. 23(3).
Chow et al., Microemulsion polymerization and reactions. Advances in Polymer Science, 2005, pp. 257-298, vol. 175.
Clayton et al., "Hydrophilic sponges based on 2-hydroxyethyl methacrylate. V. Effect of crosslinking agent reactivity on mechanical properties", Polymer International, 1997, pp. 201-207, vol. 44.
Gan et al., "The zwitterion effect in proton exchange membranes as synthesised by polymerisation of bicontinuous microemulsions", Chem. Commun., 2005, pp. 4459-4461. Epub Aug. 3, 2005.
Gan et al., "Microporous polymeric composites from bicontinuous microemulsion polymerization using a polymerizable nonionic surfactant", Polymer, Oct. 1997, pp. 5339-5345, vol. 38, No. 21.

Gozdz et al., "Triply periodic surfaces and multiply continuous structures form the Landau model of microemulsions", Physical Review E, Nov. 1996, pp. 5012-5027, vol. 54, No. 5.
Griffith et al., Artificial human corneas: Scaffolds for transplantation and host regeneration. Cornea, 2002, pp. 54-61, vol. 21 (Suppl 2).
Griffith et al., Functional human corneal equivalents from cell lines. Science, Dec. 1999, pp. 2169-2172, vol. 286.
Haverymeyer et al., "Absorption changes under UV illumination in doped PMMA", Appl. Phys. B, 2001, pp. 201-205, vol. 72. Epub Oct. 5, 2000.
Hicks et al., Corneal Replacement Using a Synthetic Hydrogel Cornea, AlphaCor™ : Device, Preliminary Outcomes and Complications. Eye, 2003, pp. 385-392, vol. 17.
Hicks et al., Outcomes of transplantation of an artificial cornea, AlphaCor™ : The effects of prior ocular herpes simplex infection. Cornea, 2002, pp. 685-690, vol. 21.
Hsiue et al., Preparation of controlled release ophthalmic drops for glaucoma therapy using thermosensitive poly N-isopropylacrylamide. Biomaterials, 2002, pp. 457-462, vol. 23.
Hsiue et al., Surface modification of silicone rubber membrane by plasma induced graft copolymerization as artificial cornea. Artificial Organs 1996, pp. 1196-1207, vol. 20.
Kim et al., "Temperature-responsive and degradable hyaluronic acid/Pluronic composite hydrogels for controlled release of human growth hormone", Journal of Controlled Release, 2002, pp. 69-77, vol. 80.
Lai et al., Control of properties of silicone hydrogels using a pair of hydrophilic monomers. J Appl Polym Sci., 1996, pp. 2051-2058, vol. 61.
Lai et al., Surface wettability enhancement of silicone hydrogel lenses by processing with polar plastic molds. J Biomed Mater Res 1997, pp. 349-356, vol. 35.
Merrett et al., "Adhesion of corneal epithelial cells to cell adhesion peptide modified pHEMA surfaces", *J Biomater Sci Polym Edn*, 2001, pp. 647-671, vol. 12.
Merrett et al., "Interactions of corneal cells with TGF-β2 modified poly dimethyl siloxane surfaces", J Biomed Mater Res, 2003, pp. 981-993, vol. 67A.
Noh et al., "Effects of cross-linking molecular weights in a hyaluronic acid-poly(ethylene oxide) hydrogel network on its properties", Biomedical Materials, Jun. 9, 2006, pp. 116-123, vol. 1.
Princz et al., "Release of wetting agents from Nelfilcon contact lenses", Invest. Ophthalmol. Vis Sci., 2005, vol. 46, E-Abstract 907.
Queste, "Communication pursuant to Article 94(3) EPC", Jun. 13, 2008, European Patent Office, Netherlands, in European Patent Application No. 04749259.0.
Segura, et al., "Crosslinked hyaluronic acid hydrogels: a strategy to functionnalize and pattern", Biomaterials, 2005, vol. 26, pp. 359-371.
Simamora et al., "Controlled delivery of pilocarpine. 2. In vivo evaluation of Gelfoam Device", International Journal of Pharmaceutics, 1998, pp. 209-214, vol. 170.
Stile et al., "Synthesis and characterization of injectable poly(N-isopropylacrylamide)-based hydrogels that support tissue formation in vitro", Macromolecules, 1999, pp. 7370-7379, vol. 32. Epub Oct. 12, 1999.
Thompson et al., "Long-term graft survival after penetrating keratoplasty", Ophthalmology, Jul. 2003, pp. 1396-1402, vol. 10.
Van Beek et al., "Hyaluronic acid containing hydrogels for the reduction of protein adsorption", Biomaterials, 2008, pp. 780-789. Epub Nov. 26, 2007.
Van Beek et al., "The Effect of Wetting Agents on Competitive Protein Adsorption to HEMA and HEMA/MA/PVP Hydrogels", Invest. Opthalmol. Vis. Sci., 2006, vol. 47: E-Abstract 112.
Vandamme, "Microemulsions as ocular drug delivery systems: recent developments and future challenges", Progress in Retinal and Eye Research, 2002, pp. 15-34, vol. 21.
Whitcher et al., Corneal blindness: A global perspective. Bull World Health Org 2001; pp. 214-221, vol. 79.
Willis et al., "A novel phosphorylcholine-coated contact lens for extended wear use", Biomaterials, 2001, pp. 3261-3272, vol. 22.
Zhang et al., "Effect of mixed solvents on characteristics of poly (N-isopropylacrylamide) gels)", *Langmuir*, 2002, pp. 2538-2542, vol. 18. Epub Feb. 21, 2002.

Leach et al., "Characterization of protein release from photocrosslinkable hyaluronic acid-polythylene glycol hydrogel tissue engineering scaffords", Biomaterials, 2005, pp. 125-135, vol. 26.

Leach et al., "Photocrosslinked Hyaluronic Acid Hydrogels: Natural, Biodegradable Tissue Engineering Scaffolds", Biotechnology and Bioengineering, Jun. 5, 2003, pp. 579-589, vol. 82, No. 5.

Lee et al., "Artificial cornea: Surface modification of silicone rubber membrane by graft polymerization of pHEMA via glowdischarge", *Biomaterials*, 1996, pp. 587-595, vol. 17.

Levy, An artificial cornea is in site, thanks to biomimetic hydrogels, Sep. 13, 2006, http://www.stanford.edu/dept/news/pr/2006/pr-cornea-091306.html.

Li et al., "Cellular and nerve regeneration within a bio-synthetic extracellular matrix for corneal transplantation", Proc Natl Acad Sci USA, Dec. 2003, pp. 15346-15351, vol. 100.

Liu et al., "Nanofabrication in polymer matrices", Progress in Polymer Science, 2003, pp. 5-26, vol. 28.

Liu et al., Nanostructured Polymeric Materials from Microemulsion Polymerization using Poly(ethylene oxide) Macromonomer, Langmuir, 1997, pp. 6421-6426, vol. 13.

Liu et al., "Synthesis and Polymerization of a Nonionic Surfactant: Poly (Ethylene Oxide) Macromonomer", J.M.S.—Pure Appln. Chem., 1996, pp. 337-352, A33(3).

Liu et al., "Wetting agent release from contact lenses", Invest. Ophthalmol. Vis. Sci., 2005, vol. 46, E-Abstract 908.

Lopez-Alemany et al., "Porous structure of Purevision™ versus Focus® Night and Day™ and conventional hydrogel contact lenses", J Biomed Mater Res (Appl Biomater), 2002, pp. 319-325, vol. 63.

* cited by examiner

FORMING COPOLYMER FROM BICONTINUOUS MICROEMULSION COMPRISING MONOMERS OF DIFFERENT HYDROPHILICITY

FIELD OF THE INVENTION

The present invention relates generally to polymers suitable for artificial cornea or contact lens applications, and particularly to copolymers formed from bicontinuous microemulsions and methods for forming them.

RELATED APPLICATIONS

This application is a national stage filing under 35 U.S.C. §371 of International PCT Patent Application No. PCT/SG2009/000097, filed on 19 Mar. 2009, which is incorporated herein by reference.

BACKGROUND OF THE INVENTION

WO 2006/014138 to Chow et al. (hereinafter "Chow") discloses a polymer for drug delivery, which can be used in a contact lens or artificial cornea. In this technique, the polymer may be formed from a bicontinuous microemulsion, which includes water, a monomer, a surfactant copolymerizable with the monomer, and a drug. In one example disclosed in Chow, the monomer is a combination of methyl methacrylate (MMA) and 2-hydroxylethyl methacrylate (HEMA) monomers. The monomer concentration in the microemulsion may be adjusted to change the properties of the resulting product.

SUMMARY OF THE INVENTION

It has been discovered that a polymer can be formed by including in the microemulsion a combination of first and second monomers. The first monomer is more hydrophilic than HEMA, and may be N-vinylpyrrolidone (NVP) or methacrylic acid (MAA). The second monomer is as hydrophilic as HEMA or is less hydrophilic than HEMA. The second monomer may be hydrophobic, such as MMA.

For example, a porous polymer may be formed and the properties of the porous structure may be conveniently adjusted by adjusting the contents of the microemulsion. A polymer with improved oxygen permeability and equilibrium water content may also be obtained. Such improvement may be obtained while maintaining the mechanical strength of the polymer at a suitable level.

Accordingly, in an aspect of the present invention, there is provided a method of forming a polymer. A bicontinuous microemulsion comprising water, a surfactant, and a combination of monomers copolymerizable for forming a porous copolymer is provided. The combination of monomers comprises a first monomer more hydrophilic than 2-hydroxyethyl methacrylate (HEMA), and a second monomer as hydrophilic as, or less hydrophilic than, HEMA. The monomers in the bicontinuous microemulsion are polymerized to form the porous copolymer. The first monomer may comprise N-vinylpyrrolidone (NVP) or methacrylic acid (MAA). The second monomer may comprise HEMA or methyl methacrylate (MMA). The combination of monomers may have a total concentration of about 38 wt % or less in the microemulsion. The second monomer may have a concentration of from about 10 to about 25 wt % in the microemulsion. The concentration of water in the microemulsion may be from about 25 to about 50 wt %. The concentration of the surfactant in the microemulsion may be from about 10 to about 50 wt %. The microemulsion may comprise a cross-linker, such as ethylene glycol dimethacrylate (EGDMA). The microemulsion may comprise a polymerization initiator, such as 2,2-dimethoxy-2-phenyl acetophenone (DMPA). The surfactant may be a poly(ethylene oxide)-macromonomer, such as ω-methoxy poly(ethylene oxide)$_{40}$ undecyl α-methacrylate macromonomer.

In accordance with another aspect of the present invention, there is provided a copolymer formed according to the method described in the preceding paragraph.

In accordance with a further aspect of the present invention, there is provided a copolymer defining interconnected pores and comprising polymerized monomers. The monomers comprise a first monomer more hydrophilic than HEMA; and a second monomer as hydrophilic as, or less hydrophilic than, HEMA. The first monomer may comprise NVP or MAA. The second monomer may comprise HEMA or MMA. The pores may have a pore diameter of about 10 to about 100 nm. The weight ratio of the first monomer to the copolymer may be about 0.15 to about 0.2. The weight ratio of the second monomer to the copolymer may be about 0.15 to about 0.2. The copolymer may have one or more of the following properties: an oxygen permeability coefficient of from about 10 to about 30, such as about 26; an equilibrium water content of about 76 wt % or higher, or from about 50 to about 76 wt %; a light transmission percentage of about 88% or higher, such as about 95% or higher; a glucose diffusion permeability coefficient of about $1\times10^{-6}$ to about $4\times10^{-6}$ cm$^{-2}$/s, or about $2\times10^{-6}$ cm$^{-2}$/s or higher; an albumin diffusion permeability coefficient of about $1.4\times10^{-7}$ cm$^{-2}$/s or higher, or from about $0.1\times10^{-6}$ to about $2\times10^{-6}$ cm$^{-2}$/s; a tensile strength of about 2 MPa or higher, or from about 1 to about 7 MPa; a Young's modulus of about 100 MPa or higher, or from about 90 to about 400 MPa. The copolymer may be formed according to a method described herein.

Other aspects and features of the present invention will become apparent to those of ordinary skill in the art upon review of the following description of specific embodiments of the invention in conjunction with the accompanying figures.

BRIEF DESCRIPTION OF THE DRAWINGS

In the figures, which illustrate, by way of example only, embodiments of the present invention.

DETAILED DESCRIPTION OF EXEMPLARY EMBODIMENTS

Figure 1:
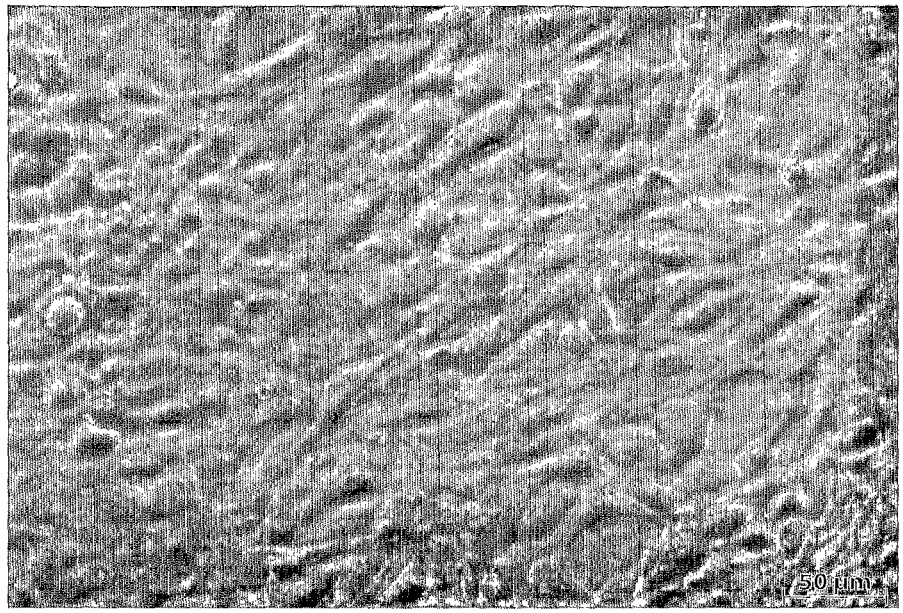
FIG. 1 is a phase-contrast image of corneal epithelial cells cultivated on a copolymer sample, exemplary of an embodiment of the present invention.
Figure 2:
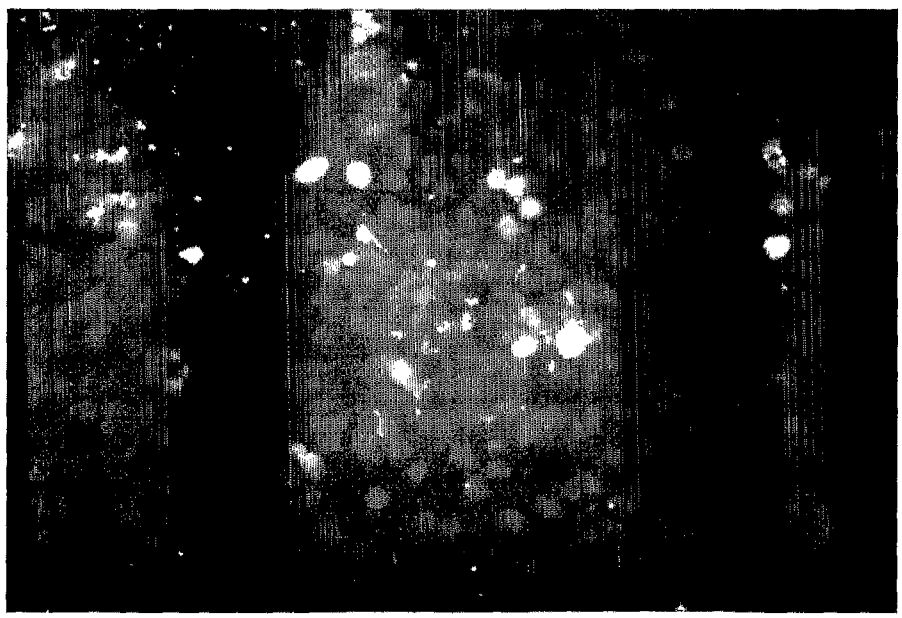
FIGS. 2 and 3 are phase-contrast images of stained corneal epithelial cells cultivated on another copolymer sample, prepared according to an exemplary embodiment of the present invention.
Figure 3:
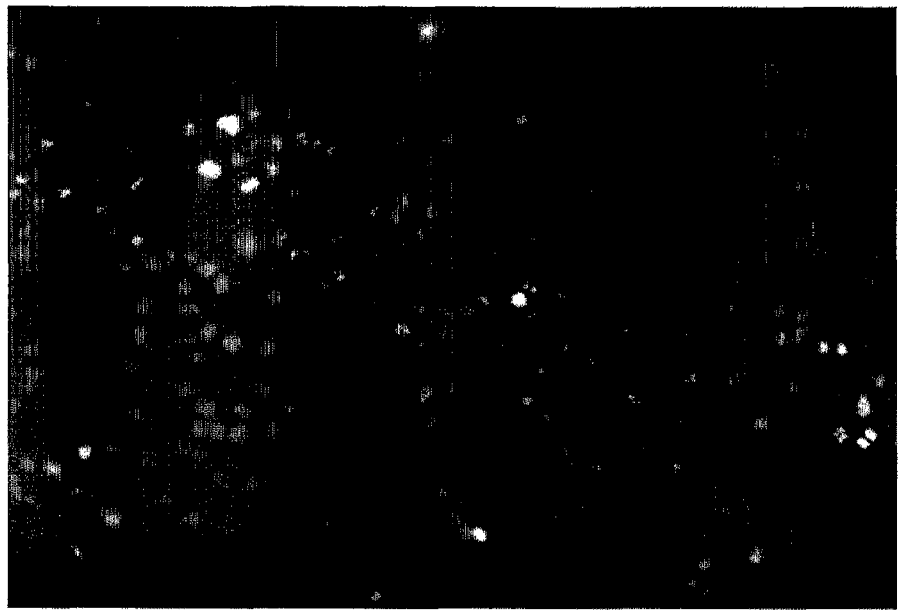
Figure 4:
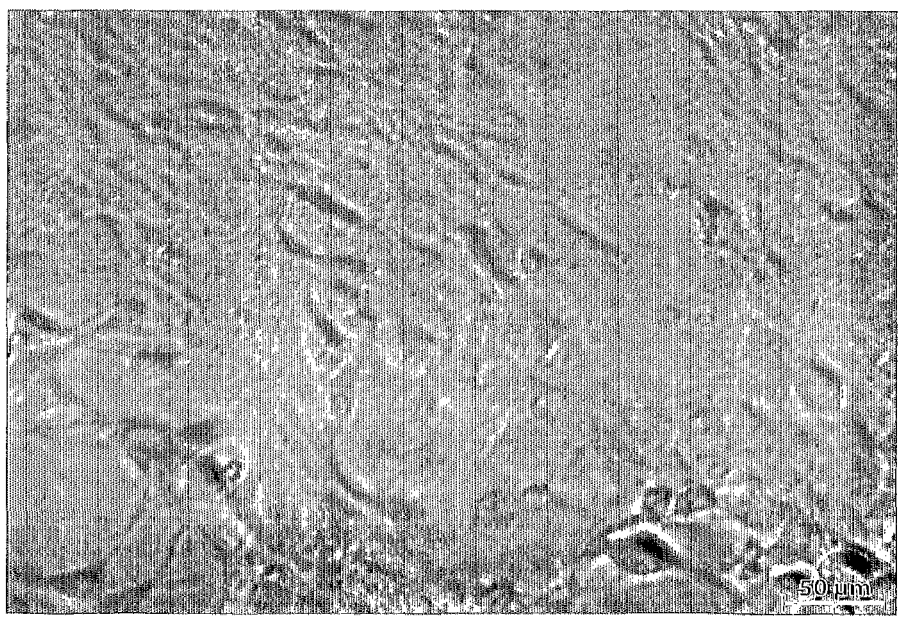
FIGS. 4 to 8 are phase-contrast images of corneal epithelial cells cultivated on comparison polymers.
Figure 5:
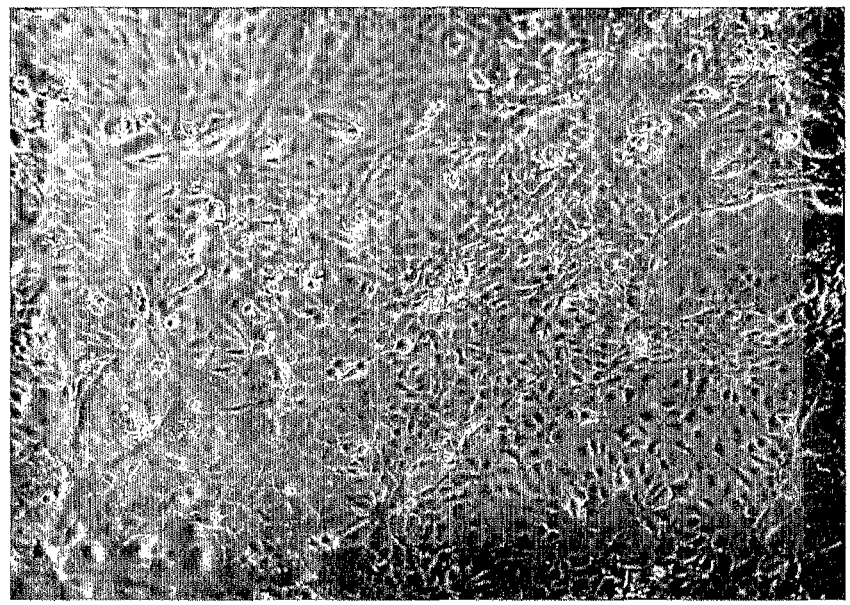
Figure 6:
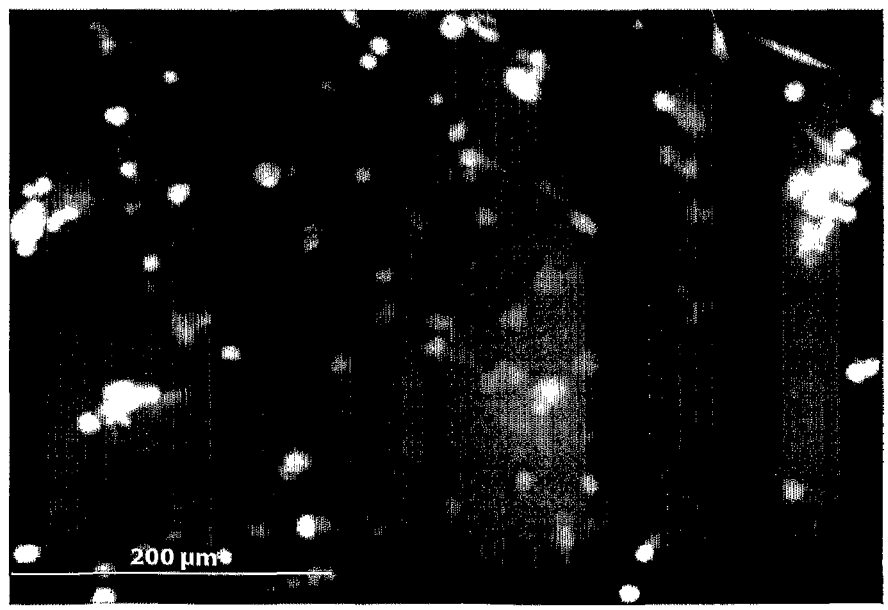

An exemplary embodiment of the present invention is related to a transparent and porous polymer. The polymer has physical, chemical, and biological properties that are suitable for use in artificial cornea or contact lens applications. The polymer contains a copolymer formed from a first monomer and a second monomer. The first monomer may be N-vinylpyrrolidone (NVP) or methacrylic acid (MAA). The second monomer is 2-hydroxylethyl methacrylate (HEMA).

Where a list of items is provided with an "or" before the last item herein, any one of the items may be used; and a possible combination of any two or more of the listed items may also be used, as long as the combined items are not inherently incompatible or exclusive.

In some exemplary embodiments, the copolymer also contains a surfactant component, and the weight ratio of each of the first and second monomers to the copolymer may be about 0.15 to about 0.2 on a dry basis. The surfactant may be polymerizable with the monomers and may be a poly(ethylene oxide)-macromonomer (PEO-macromonomer), such as ω-methoxy poly(ethylene oxide)$_{40}$-undecyl α-methacrylate macromonomer, denoted herein as $C_1$-PEO-$C_{11}$-MA-40. The chain length of the macromonomer can be varied. For example, the macromonomer may be in the form of $CH_3$—O—$(CH_2CH_2O)_x$—$(CH_2)_n$V, or may be zwitterionic surfactants such as $SO_3^-(CH_2)_m{}^+NCHCHCHN(CH_2)_n$V, where m is an integer ranging from 1 to 20, n is an integer ranging from 6 to 20, x is an integer ranging from 10 to 110, and V is (methyl)acrylate or another copolymerisable unsaturated group.

In some exemplary embodiments, the copolymer may exhibit good light transmission properties, such as a light transmission percentage of about 95% or higher; refractive index of about 1.35 to about 1.45; glucose diffusion permeability coefficient of about $1.4\times10^{-6}$ cm$^2$/s; albumin diffusion permeability coefficient of about 0.1 to about $2\times10^{-6}$ cm$^2$/s; equilibrium water content of about 50 to about 76%; oxygen permeability coefficient ($D_k$) of about 10 to about 30; tensile strength of about 1 to about 7 MPa; and young's modulus of about 90 to about 400 MPa.

In one embodiment, the copolymer may have an oxygen permeability coefficient of about 26 or higher, such as from about 26 to about 28. Oxygen permeability may be measured using a Polarographic method, also known as the FATT method named after Dr. Irving Fatt. This method may be performed with a Model 201T Oxygen Permeometer, available from Rehder™, M201T). For further details, see <http://www.rehder-dev.com/DkEquipment.html> as of Jan. 3, 2009.

The copolymer may have an equilibrium water content of about 76 wt % (weight percent) or higher, such as about 76 or about 77 wt %. The equilibrium water content (Q) of a copolymer is calculated as follows:

$$Q=(W_S-W_d)\times100/W_S, \quad (1)$$

where $W_S$ is the saturation weight and $W_d$ is the dry weight. The saturation weight may be measured after immersing the polymer in water for a period of time so that the total weight will no longer increase significantly upon further immersion.

The copolymer may also have a light transmission percentage higher than 88%, such as from about 88 to about 93%; a refractive index from about 0.9 to about 1.3; a glucose diffusion permeability coefficient of about $2\times10^{-6}$ cm$^{-2}$/s or higher, such as from about $2.1\times10^{-6}$ to about $3.2\times10^{-6}$ cm$^{-2}$/s; an albumin diffusion permeability coefficient of higher than about $1.4\times10^{-7}$ cm$^{-2}$/s; such as about $1.4\times10^{-7}$ to about $1.8\times10^{-7}$ cm$^{-2}$/s; a tensile strength of about 2 MPa or higher; a Young's modulus of about 100 MPa or higher.

For medical applications, the copolymer should be safe and biocompatible with human tissues and cells. For example, for use as contact lenses, it is desirable that the polymer is permeable to fluids such as gases (e.g. $O_2$ and $CO_2$), various salts, nutrients, water and diverse other components of the tear fluid. The presence of nanopores distributed throughout the polymer facilitates the transport of gases, molecules, nutrients and minerals through the eye and the surroundings.

When used in an artificial cornea, the polymer should have sufficient optical clarity, an appropriate refractive index, sufficient strength to withstand surgical procedures, and be non-toxic, non-immunogenicity and non-inflammatory.

As used herein, the term "transparent" broadly describes the degree of transparency that is acceptable for an artificial cornea, contact lens, or like devices. For example, the degree of transmission of visible light through the copolymer may be equivalent to that of other materials employed in the manufacture of artificial cornea, contact lenses or other ophthalmic devices.

In one embodiment, the copolymer has a polymer matrix defining interconnected pores. Pores are interconnected when at least some of them are joined or linked with each other to form one or more continuous networks. The pores can be filled with a fluid such as water, air, or another fluid. The fluid may be releasable from the polymer.

The pores may have a pore diameter of about 30 to 80 nm. The pores may have round or other cross-sectional shapes and may have different sizes. As used herein, a pore diameter refers to the average or effective diameter of the cross-sections of the pores. The effective diameter of a cross-section that is not circular equals the diameter of a circular cross-section that has the same cross-sectional area as that of the non-circular cross-section. In some embodiments, such as when the copolymer is swellable when the pores are filled with water, the sizes of the pores may change depending on the water content in the copolymer. When the copolymer is dried, some or all of the pores may be filled or partially filled by a gas such as air. The copolymer may thus behave like a sponge. In alternative embodiments, the pore diameter may be in the range from about 10 to 100 nm when the copolymer is in a dry condition wherein the water content of the polymer is at or near minimum.

The pores may be randomly distributed. Some of the pores may be closed pores, meaning that they are not connected or joined with other pores or open to the surfaces of the copolymer. It is not necessary that all of the pores are interconnected since as more fully discussed below. Depending on use, copolymers can be prepared to have more or less interconnected pores as would be understood by a skilled person.

The copolymer may be formed according to an exemplary method described herein.

In an exemplary embodiment of the present invention, the copolymer described herein may be prepared as follows. A bicontinuous microemulsion containing water, a surfactant, and a combination of monomers copolymerizable for forming a porous copolymer is provided. The combination of monomers includes the first and second monomers. The polymerizable monomers, and the surfactant, in the bicontinuous microemulsion are polymerized to form the porous copolymer.

The contents of the microemulsion are selected so that the microemulsion is bicontinuous. As a result, the formed copolymer has interconnected pores.

As is understood in the art, "microemulsion" refers to a thermodynamically stable dispersion of one liquid phase into another liquid phase. The microemulsion may be stabilized by an interfacial film of surfactant. One of the two liquid phases is hydrophilic or lipophobic (such as water) and the other is hydrophobic or lipophilic (such as oil). Typically, the droplet or domain diameters in microemulsions are about 100 nanometers or less, and thus the microemulsions are transparent. A microemulsion can be continuous or bicontinuous. The preparation of microemulsions is known in the art. For example, a mixture of the components may be dispersed to form a microemulsion by standard techniques such as sonication, vortexing, or other agitation techniques for creating microdroplets of the different phases within the mixture. Alternatively, the mixture may be passed through a filter having pores on the nanometer scale so as to create fine droplets.

Depending on the proportions of various components and the hydrophile-lipophile value of the surfactant, the droplets can be swollen with oil and dispersed in water (referred to as normal or O/W microemulsion), or swollen with water but dispersed in oil (referred to as inverse or W/O microemulsion), or the microemulsion can be bicontinuous.

In the bicontinuous microemulsion, oil domains (containing the monomers) and aqueous domains (containing water) are randomly distributed and respectively interconnected, extending in all three dimensions. When the oil domains are polymerized, the presence of the aqueous domains results in interconnected pores filled with the water that was present in the aqueous domains.

While the monomers mainly remain in the oil domain, the hydrophilic groups of the monomers may however extend into the water domain. When the monomer is more hydrophilic, a larger portion of the monomer may extend into the water domain. This may have the effect of reducing the pore sizes in the resulting copolymer as some of the space in the water domain is occupied by a hydrophilic portion of the polymerized monomer. The higher the hydrophilicity of the monomer, the more pronounced this effect may be. Further, the internal surfaces of the pores in the resulting copolymer may also become more hydrophilic as the surface region is populated with more hydrophilic groups of the monomer when the copolymer is formed.

The surfactant typically remains in the interfacial region between the two different domains, and stabilizes their separation.

The surfactant may include one or more surfactants. A surfactant may be copolymerizable with at least one of the monomers. A polymerizable surfactant is capable of polymerizing with itself or with other monomeric compounds to form a polymer. The surfactant for the mixture can be any suitable surfactant that can co-polymerize with at least one of the monomers in the microemulsion. As can be appreciated, when the surfactant is copolymerized into the copolymer, there is no need to separate the surfactant from the copolymer after polymerization. This can be advantageous as the polymer formation process is simplified. The surfactant can be anionic, non-ionic or zwitterionic. Exemplary surfactants include those described above.

The choice and weight ratio of the monomers and surfactant for a given application may depend on the application. Generally, they should be chosen such that the resulting copolymer is suitable and compatible with the environment in which the copolymer is to be used and has the desired properties. As discussed earlier, adjustment and balancing of the properties of the copolymer is conveniently facilitated by the presence of both the first and the second monomers.

The water in the microemulsion can be pure water or a water-based liquid. The water may optionally contain various additives having specific properties. Such additives can be selected for achieving one or more desired properties in the resulting copolymer, and can include one or more of a drug, a protein, an enzyme, a filler, a dye, an inorganic electrolyte, a pH adjuster, and the like.

As will be understood by a skilled person in the art, a nanoporous and transparent polymer matrix can be obtained when the components of the microemulsion are in appropriate ratios and the droplets or domains have appropriate sizes. As is known to persons skilled in the art, to determine the appropriate proportions of the components suitable for forming a bicontinuous microemulsion, a ternary phase diagram for the monomers, water and the surfactant may be prepared. The region on the diagram corresponding to single-phase microemulsion may be identified and the proportions of the components may be so chosen such that they fall within the identified region. A person skilled in the art will be able to adjust the proportions according to the diagram in order to achieve a certain desirable property in the resulting copolymer. Further, the formation of a bicontinuous microemulsion can be confirmed using techniques known to persons skilled in the art. For example, the conductivity of the mixture may increase substantially when the microemulsion is bicontinuous. The conductivity of the mixture may be measured using a conductivity meter after titrating a 0.1 M sodium chloride solution into the mixture.

Suitable bicontinuous microemulsions can be formed when proportions of the components are respectively from about 25 to about 50 wt % for water, from about 10 to about 50 wt % for the combination of monomers, from about 10 to about 25 wt % of NVP, from about 10 to about 50 wt % of MAA, and from about 10 to about 50 wt % for the surfactant.

Persons skilled in the art, with the guidance provided in this disclosure, will be able to adjust the contents of the monomers and surfactants to achieve a desired effect on the various properties of the resulting copolymer, for example to improve the mechanical strength or hydrophilicity of the resulting copolymer.

In one exemplary embodiment, the combination of monomers may have a total concentration of about 38 wt % in the microemulsion. The concentration of HEMA may be about 15 wt %.

The microemulsion may be polymerized by standard techniques known to a skilled person. For example, it may be polymerized by heat, the addition of a catalyst, by irradiation of the microemulsion or by introduction of free radicals into the microemulsion. The method of polymerization chosen will be dependent on the nature of the components of the microemulsion.

Polymerization of the microemulsion may involve the use of a catalyst. The catalyst may be any catalyst or polymerization initiator that promotes polymerization of the monomers and the surfactant. The specific catalyst chosen may depend on the particular monomers, and polymerizable surfactant used or the method of polymerization. For example, polymerization can be achieved by subjecting the microemulsion to ultraviolet (UV) radiation if a photo-initiator is used as a catalyst. Exemplary photo-initiators include 2,2-dimethoxy-2-phenyl acetophenone (DMPA) and dibenzylketone. A redox-initiator may also be used. Exemplary redox-initiators include ammonium persulphate and N,N,N',N'-tetramethylethylene diamine (TMEDA). Thermal initiators may also be used, which may include free radical initiators such as peroxides. A thermal initiator initiates polymerization as the temperature is increased. For example, in one embodiment, thermal curing may be achieved by using Perkadox 16 as the thermal initiator and curing the material at a temperature of about 70° C. for 1 hour. A combination of photo-initiator, redox-initiator, or thermal initiator may also be used. In this regard, including in the microemulsion an initiator can be advantageous. The polymerization initiator may be about 0.1 to about 0.4 wt % of the microemulsion.

To promote cross-linking between polymer molecules in the resulting copolymer, a cross-linker may be added to the mixture. Suitable cross-linkers include ethylene glycol dimethacrylate (EGDMA), diethylene glycol dimethacrylate, diethylene glycol diacrylate, or the like.

The microemulsion may be formed into a desired end shape and size prior to polymerization. For example, a sheet material may be formed by pouring or spreading the mixture into a layer of a desired thickness or by placing the mixture between glass plates prior to polymerization. The mixture may also be formed into a desired shape such as a rod, for example, by pouring the mixture into a mold or cast prior to polymerizing.

After polymerization, the copolymer may be rinsed and equilibrated with water to remove un-reacted monomers and any other un-reacted substances. The rinsed copolymer can be optionally dried and sterilized in preparation for use in a medical or clinical application. Both drying and sterilization can be accomplished in any suitable manner, which is known to person of skill in the art. In some embodiments, both drying and sterilization can be effected at a low temperature so as not to adversely affect a material contained in the copolymer, for example by using ethyleneoxide gas or UV radiation.

The polymerization process may be carried out in one step.

The resulting copolymer can be used to form artificial corneas or other ophthalmic devises or articles such as contact lenses. The artificial corneas can be used for corneal wound healing applications. The contact lenses formed can be used for vision correction or eye color modification, or can be diabetic contact lenses.

The copolymer formed from the bicontinuous microemulsion defines interconnected pores.

The weight ratio of HEMA to the copolymer may be about 0.15 to about 0.2 and the weight ratio of NVP or MAA to the copolymer may be about 0.15 to about 2.

In other embodiments, NVP or MAA may be replaced with one or more other highly hydrophilic monomers. A monomer is considered to be "highly" hydrophilic herein when it is more hydrophilic than HEMA. Typically, the more hydrophilic terminal groups a monomer has, the more hydrophilic the monomer. Thus, a highly hydrophilic monomer can have more hydrophilic terminal groups in its base structure than HEMA does. Alternatively, the hydrophilic groups in a highly hydrophilic monomer may be individually more hydrophilic than the hydrophilic groups of HEMA. The hydrophilicity of a material may be measured by its equilibrium water content. As can be appreciated, NVP and MAA are highly hydrophilic. There are other materials, such as silicone-based monomers, which are also highly hydrophilic. NVP and MA may thus be replaced by such other materials. A highly hydrophilic material may be amphiphilic.

HEMA may be replaced with anther monomer that is as hydrophilic as, or less hydrophilic than, HEMA. For example, the second monomer may be methyl methacrylate (MMA).

In exemplary embodiments of the present invention, the combination of the first and second monomers and their concentrations may be conveniently selected so that the resulting copolymer has the desired properties for a particular application.

While a selected monomer should be copolymerizable with another monomer or the surfactant, the monomer may also be polymerizable with itself. The amount of each monomer that may be employed to prepare a suitable bicontinuous microemulsion can be determined by a skilled person depending on the particular application and in view of the guidance given herein.

In some embodiments, the second monomers may be selected from ethylenically unsaturated monomers including HEMA, MMA, 2-hydroxylethyl acrylate, monocarboxylic acids, glycidyl methacrylate (GMA), and silicone-based monomers. Suitable combinations of these monomers can also be used.

It has been found that when a suitable amount of a highly hydrophilic monomer, such as NVP or MAA, is used in combination with a suitable amount of a less hydrophilic monomer, such as HEMA, to form the copolymer, even if the total monomer concentration in the bicontinuous microemulsion is relatively low, such as about 38 w % or less, the resulting copolymer still has a high enough modulus and tensile strength suitable for use as an artificial cornea or contact lens. Further, the resulting copolymer exhibits improved properties such as higher oxygen permeability and equilibrium water content, reduced bulk water absorption, enhanced swelling ability and nutrients permeability. The copolymer is also still compatible with various biological materials. For example, the copolymer can support attachment and proliferation of corneal epithelial cells. The resulting copolymer can thus have balanced properties, i.e., having both acceptable mechanical/optical properties and acceptable other properties, such as surface properties, that allow improved fluid transport through or into the copolymer.

Conveniently, the copolymer according to various embodiments of the invention can be made compatible with human dermal fibroblasts cells and mechanically strong and can be advantageously used to manufacture contact lenses for placement on the eye.

The copolymer can have various desirable physical, chemical, and biochemical properties.

In some embodiments, a drug such as an ophthalmic drug can be incorporated into the copolymer such as dispersed in the microemulsion for forming the copolymer. The microemulsion may be polymerized to form a transparent and porous copolymer wherein the ophthalmic drug is incorporated, either in the copolymer or the pores, or both.

The copolymer may be used in a cornea implant. The materials may be transparent, highly flexible, easy to handle and permeable to nutrients. They may also support the attachment and proliferation of human corneal epithelial cells (HCEC), forming confluent stratified epithelial sheets. They may be biocompatible, and their use as artificial cornea may eliminate the risk of disease transmission, reduce the inconsistency in tissue composition associated with biological substrates. The materials may be custom formed or fabricated to suit specific requirements in particular applications. The material once implanted may provide an intact epithelial barrier.

Increasing the hydrophilicity of a surface can improve the wettability of the surface. Thus, when the surface of a contact lens is more hydrophilic, the contact lens may be more comfortable to wear due to increased wettability. Further, the surface of a contact lens may be susceptible to deposition of proteins and lipids from tear fluid during use. Accumulated deposits can cause eye discomfort or even inflammation. After an extended period of wearing without cleaning, the deposits can be extensive if the surface does not meet a higher standard of comfort and biocompatibility. An exemplary embodiment of the present invention may provide a contact lens material that reduces such deposits.

Exemplary copolymers according to some embodiments of the present invention may also provide improved oxygen permeability, equilibrium water content, refractive index, or glucose/albumin permeability.

To illustrate, the properties of sample polymers and exemplary processes for forming such polymers are described below.

EXAMPLES

Example I

Sample copolymers including comparison polymers were formed as follows.

For each sample, a precursor mixture was first prepared. The principle components of the mixtures for different samples are listed in Table I. The weight percentages listed were calculated based on the total weights of the listed components only. The mixtures formed bicontinuous microemulsions.

TABLE I

Contents of Microemulsion Components (wt %)

| Sample | I | II | III | IV | V | VI |
|---|---|---|---|---|---|---|
| PEO-R-MA-40 | 37.5 | 35.0 | 32.5 | 37.5 | 37.5 | 37.5 |
| Water | 25.0 | 30 | 35.0 | 25.0 | 25.0 | 25.0 |
| EGDMA | 1.0 | 1.0 | 1.0 | 1.0 | 1.0 | 1.0 |
| DMPA | 0.3 | 0.3 | 0.3 | 0.3 | 0.3 | 0.3 |
| MMA | 18.75 | 17.5 | 16.25 | 22.5 | — | — |
| HEMA | 18.75 | 17.5 | 16.25 | 15.0 | 15.0 | 15.0 |
| NVP | — | — | — | — | 22.5 | — |
| MAA | — | — | — | — | — | 22.5 |
| Total Monomers | 37.5 | 35 | 32.5 | 37.5 | 37.5 | 37.5 |

These components were mixed by vortex-mixing, respectively for each sample.

The single-phase region of a microemulsion of $C_1$-PEO-$C_{11}$-MA-40, HEMA, MMA, and water was determined by titrating water to various compositions of the microemulsion, in a screw-capped test tube. Each sample was vortex-mixed and allowed to equilibrate in a temperature-controlled environment at 23° C. The clear-turbid points were used to establish the phase boundary of the microemulsion region in a phase-diagram. A rough demarcation of the bicontinuous region was further deduced from conductivity measurements using a conductivity meter after titrating a 0.1 M sodium chloride solution into the mixture. Tests showed that a microemulsion can be formed when the aqueous content of the mixture is in the range of about 20 wt % to 60 wt % and that the conductivity of the mixture increased rapidly when the aqueous content increased from below about 20 wt % to above about 20 wt %. It is believed that the sharp increase in conductivity at about 20 wt % was due to the formation of numerous interconnected conducting channels in the microemulsion, characteristic of a bicontinuous microemulsion.

The microemulsion precursors were pre-purged with nitrogen gas to ensure there was no significant oxygen present, which, as is known, may inhibit polymerization. The precursor for a sample was placed between two glass plates or in a polymethacrylate mold. The plates or mold with the precursor was then placed in a Rayonet™ photoreactor chamber and was subjected to UV-radiation (254 nm) at about 35° C. to effect polymerization for about two hours.

After polymerization, the liquid microemulsion transformed into a solid polymer having interconnected pores filled with the water initially present in the microemulsion. No undesirable side products were observed after polymerization.

The polymerized sample material, after being removed from the plates or mold, was washed to remove unpolymerized residue monomer, surfactant, timolol maleate, and etc. The sample material was washed successively with deionized distilled water at temperatures between the room temperature to about 60° C. for one to two hours. At the end of washing, no substantial amount of un-reacted monomers and timolol was present in the sample material, as confirmed by the absence of UV absorption bands between 190 and 350 nm in the washing solution.

The cross-sectional topography of sample polymeric membranes was conducted using a JEOL 6700™ field emission gun scanning electron microscope (FEG-SEM). The membranes were freeze-fractured in liquid nitrogen to expose the cross-sections. Prior to examination, they were vacuum dried at room temperature for about 24 hours, and then coated with a thin layer of gold (using a JEOL ion-sputter JFC-1100™). The thermal behavior of the polymer samples (~10 mg each) was evaluated for 30-600° C. (ramp rate=10° C./min) under dry nitrogen flow using a Perkin Elmer TGA7™ thermal gravimetric analyzer.

To measure the equilibrium water content of the polymer membranes, pre-weighed dry samples were immersed in deionized water at various temperatures. The samples were immersed in water for at least 24 hours before the saturation weight was measured. After the excess surface water was removed with a piece of filter paper, the weight of each fully swollen (water saturated) sample was recorded. The equilibrium water content was calculated according to Equation (1).

The strain, Young's modulus and tensile strength of the sample membranes were measured using an Instron™ microforce tester (Instron 4502, USA). Samples of a standard size were used according to ASTM (American Society for Testing and Materials) 638. The light transmission rate of the polymer membranes was examined using an Agilent 5453™ UV-visible spectrophotometer.

Refractive indices of the sample materials, fully hydrated in phosphate buffered saline (PBS), were measured on a refractometer.

Oxygen permeabilities of the materials were measured using Model 201T Permeometer (Rehder™, M201T).

Representative measured properties of the samples formed from the bicontinuous microemulsions are listed in Table II.

TABLE II

Properties of Sample Copolymers

| Sample | I | II | III | IV | V | VI |
|---|---|---|---|---|---|---|
| Oxygen permeability coefficient ($D_k$) | 16 | 22 | 24 | 14 | 26 | 28 |
| Equilibrium water content (%) | 64 | 74 | 76 | 60 | 76 | 77 |
| % of light transmission (400-800 nm) | 89 | 91 | 92 | 90 | 88 | 93 |
| Refractive index | 1.2 | 1.2 | 1.3 | 1.1 | 0.9 | 1.3 |
| Glucose diffusion permeability coefficient ($10^{-6}$ cm$^2$/s) | 2.4 | 3.0 | 3.6 | 1.4 | 2.1 | 3.2 |
| Albumin diffusion permeability coefficient ($10^{-7}$ cm$^2$/s) | 0.4 | 1.0 | 1.6 | 0.1 | 1.4 | 1.8 |
| Tensile strength (MPa) | 5.7 | 4.7 | 3.8 | 6.4 | 2.7 | 1.9 |
| Young's modulus (MPa) | 280 | 195 | 120 | 320 | 165 | 102 |

The sample materials were optically clear with about 90% transmission of white light, and had refractive indices of about 0.9 to about 1.3, which were comparable to that of human corneal stroma (1.38).

The glucose diffusion permeability coefficients for the materials were about $2.1 \times 10^{-6}$ to about $3.6 \times 10^{-6}$ cm$^2$/s, comparable to that of corneal stroma (about $2.5 \times 10^{-6}$ cm$^2$/s).

The albumin diffusion permeability coefficient was about $0.1 \times 10^{-7}$ to about $1.8 \times 10^{-7}$ cm$^2$/s.

The nanostructured materials were attractive for their higher permeability associated with the nanoporous channels, allowing for greater interaction between the graft and the underlying tissue and more rapid diffusion of nutrients and substances. The sample materials had mechanical properties that were suitable for withstand stitches inserted around the implant-to-rim junction. The tensile strengths varied from about 1.9 to about 5.7 MPa, which generally increased with decreasing water concentration in the microemulsions used to form the samples. The tensile strength also decreased when the water content in the test samples was increased to above about 60%. It is expected that a material with a tensile strength of about 1.9 MPa or higher and a Young's modulus of about 100 MPa or higher would have sufficient strength and durability for use in corneal implantation.

As can be seen from Table II, the sample materials showed different hydrophilicity and oxygen permeability coefficient ($D_k$). While these quantities generally increased with increasing water content in the formation mixture, Samples V and VI, which included NVP or MAA respectively, exhibited higher oxygen permeability and equilibrium water content even though these Samples were formed from a mixture with a relatively low water content, in comparison with Samples I, II, III and IV, which included MMA instead of NVP or MAA.

Thus, replacing MMA with NVP or MAA provided an improved polymer product. It is expected that replacing MMA with another strongly hydrophilic monomer may also provide improved products.

Thermal analyses showed that the decomposition temperatures ($T_d$) of the materials ranged from 300° C. to 350° C. A higher thermal stability may be desirable, such as to allow the polymer material to be sterilized during use by autoclaving prior to clinical applications.

Each sample material formed a three-dimensional (3D) nanostructured sponge-like hydrogel. It was transparent, biocompatible and permeable to nutrients, with equilibrium water content and mechanical properties that were similar to natural cornea. For example, the sample materials had appropriate transparency, mechanical strength, oxygen permeability, permeability to glucose and other nutrients, and cellular compatibility that were suitable for use as artificial cornea.

In addition to cornea, the sample material had properties that were also suitable for use as extended-wear contact lenses, or implantable and replaceable contact lenses.

Example II

Primary HCECs were used to evaluate epithelial coverage. They were seeded on Samples I to VI, supplemented with a serum-free medium containing keratinocyte growth medium supplemented with 10 ng/mL of human epidermal growth factor (HEGF), 5 µg/mL of insulin, 0.5 µg/mL of hydrocortisone, 8.4 ng/mL of cholera toxin, 30 µg/mL of bovine pituitary extract, 50 µg/mL of gentamicin, and 50 ng/mL of amphotericin B. The cells were incubated at 37° C. in 5% $CO_2$. The medium was changed every 2 days. The cells formed a confluent epithelial sheet on the polymer membranes after 7 days. The cell cultures were monitored under an inverted phase-contrast microscope.

Cell viability was determined by staining with FDA. The cultures were incubated at 37° C. with 2 µg/mL of FDA in PBS for 15 min. Each sample was washed twice in PBS, and placed in 0.1 mg/mL of propidium iodide solution for 2 min at room temperature to stain the non-viable cells. The samples were then washed twice in PBS, and viewed under a confocal laser microscope (IX70-HLSH100 Fluoview, Olympus™).

The epithelial cells began to migrate from the membrane on the second day. After 3 days, a confluent sheet of densely populated epithelial cells was formed. Under identical culture conditions, the growth rates for primary HCECs were identical (within 5%) on the sample materials and on control tissue culture plate surfaces.

Morphological analysis of tissue equivalents was performed by first embedding them in optimal cutting temperature (OCT) freezing compound (Tissue-Tek™). 5-µm sections were cut and stained with hematoxylin and eosin. Immunostaining was performed by incubating specimens with monoclonal antibody to cytokeratin K19 and Ki67. Normal mouse immunoglobulin and pancytokeratin (AE-1 and AE-3) were used as the negative and positive controls, respectively. The cells were subsequently incubated with secondary antibody (1:200 diluted biotinylated horse anti-mouse immunoglobulin G) for 1 hour. Expressed cytokeratin K19 and Ki67 were detected by immunofluorescence by incubation with fluorescein isothiocyanate (FITC)-conjugated secondary antibody (goat anti-mouse IgG), followed by mounting. Immunostained cells were examined under a confocal laser microscope.

Figure 7:
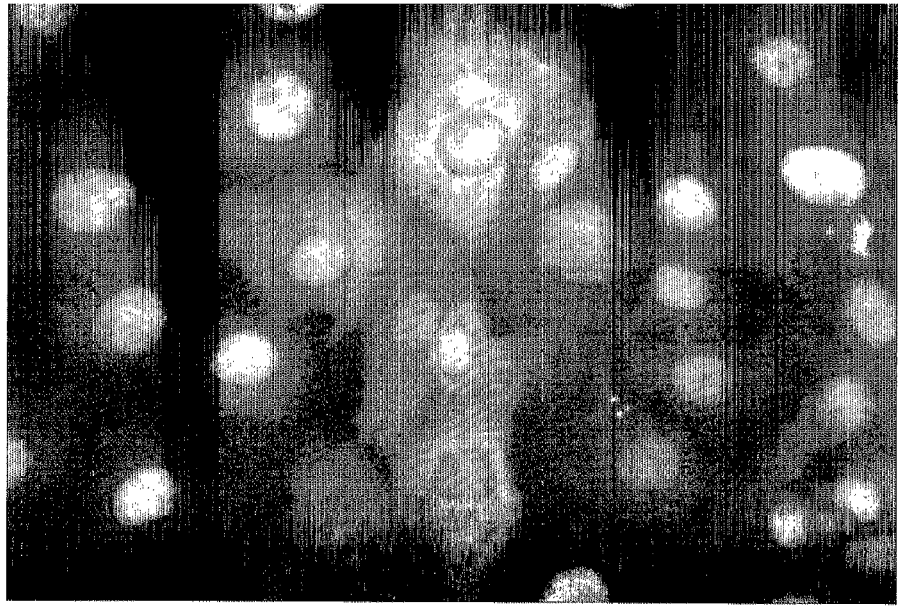
Figure 8:
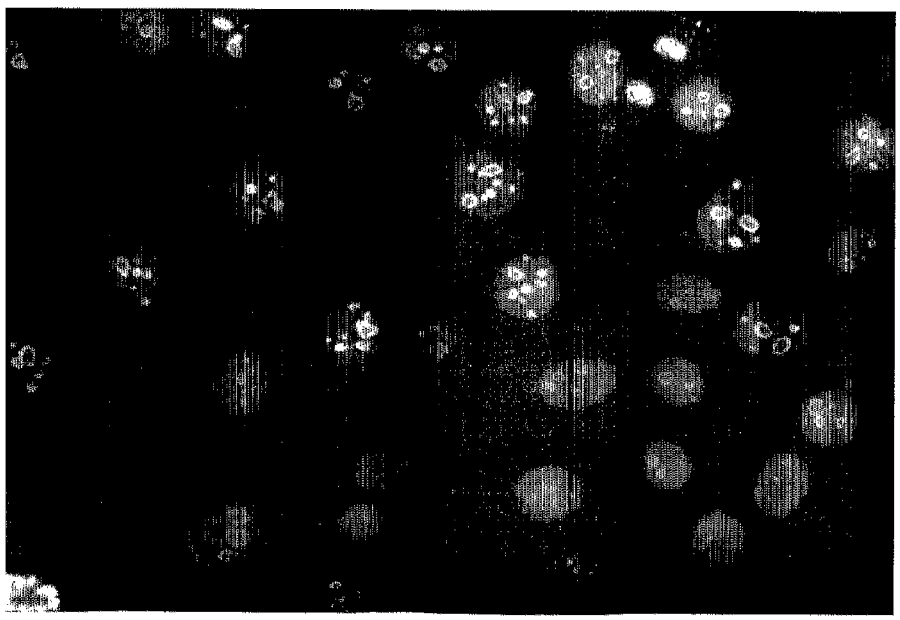

FIGS. 1 to 8 show representative phase images of the epithelial cells cultivated on sample materials, including Sample V (FIG. 1), Sample VI (FIGS. 2 and 3), Sample IV (FIG. 4), Sample I (FIGS. 5 and 6), and Sample III (FIGS. 7 and 8).

Cells cultivated on Sample VI formed a confluent sheet of corneal epithelial cells, with some areas containing more elongated cells. The corneal epithelial cells shown in FIGS. 2 and 3 were stained positively for K19 and Ki67 respectively. The corneal epithelial cells shown in FIG. 6 were stained positively for fluorescein diacetate (FDA). The corneal epithelial cells shown in FIGS. 7 and 8 were also stained positively for K19 and Ki67 respectively.

The cells on the sample materials displayed a healthy morphology with areas of stratification and differentiation. Most of the cells in the epithelial sheet were found to be viable. The cultured corneal epithelial cells also demonstrated a positive immunoreactivity for antibodies AE1 and AE3, and cytokeratin K19 (see e.g. FIG. 2). A large portion of cells stained positively for Ki67, indicating cell proliferation (see e.g. FIG. 3).

The sample materials were used to support human corneal epithelium cell growth and adhesion. It was found that the sample materials supported attachment and proliferation of corneal epithelial cells, as well as stratification. No cell toxicity was observed. Thus, the materials may be used as a scaffold for keratoprothesis.

Example III

The sample polymer materials (Samples I, II and III) were implanted into the right eye of New Zealand white rabbits according to the ARVO (The Association for Research in Vision and Ophthalmology) Statement for the Use of Animals in Ophthalmology and Vision Research. Recipient animals were anesthetized with 4 mL of intramuscular ketamine and xylazine (volume ratio=1:7) and topical xylocaln. 6-mm circular stromal pockets were made from the limbus, and a piece of a Sample copolymer material (6 mm-diameter) was inserted into the pocket (n=3) as artificial cornea.

Sample artificial cornea materials were designed and formed from the Sample materials described in EXAMPLE I and were inserted during a full-thickness penetrating keratoplasty procedure. It was held in place with sutures and by biointegration with the native cornea. The biointegration, survival, and possible complications of the material in the rabbit eyes were investigated. Sutures were removed one week after surgery. Slit lamp examination of the rabbit corneas showed re-epithelialization within the first week. Although a mild haze was initially observed, none of the implants showed any sign of inflammation or rejection over this period. Sections through an implant one week after surgery showed a normal histological appearance, as compared to the contralateral corneas that were not subjected to surgery. Sodium fluorescein showed no staining, indicating the presence of an intact epithelial barrier. The rabbit eye sections that were stained with hematoxylin and eosin also showed a stratified epithelium over the implant, illustrating that the implants were well integrated within the host corneas.

No adverse reactions were observed in the rabbits. The artificial cornea remained optically clear. Topography measurements also showed that the surface of the artificial cornea was smooth and had a profile similar to a normal eye. It was observed that the implanted sample polymer promoted regeneration of corneal cells, and demonstrated stable host-graft integration.

Other features, benefits and advantages of the present invention not expressly mentioned above can be understood from this description and the drawings by those skilled in the art.

Although only exemplary embodiments of this invention have been described above, those skilled in the art will readily appreciate that many modifications are possible therein without materially departing from the novel teachings and advantages of this invention.

The invention, rather, is intended to encompass all such modification within its scope, as defined by the claims.

What is claimed is:

1. A method of forming a polymer, comprising:
providing a bicontinuous microemulsion comprising water, a surfactant, and a combination of monomers, said surfactant and monomers being copolymerizable for forming a porous copolymer, wherein said combination of monomers comprises
a first monomer more hydrophilic than 2-hydroxyethyl methacrylate (HEMA), comprising N-vinylpyrrolidone (NVP) or methacrylic acid (MAA), and
a second monomer as hydrophilic as, or less hydrophilic than, HEMA, comprising HEMA or methyl methacrylate (MMA);
polymerizing said surfactant and monomers in said bicontinuous microemulsion to form said porous copolymer, wherein said surfactant and monomers and their respective concentrations in said bicontinuous microemulsion are chosen so that said copolymer has an equilibrium water content of about 76 wt % or higher and has at least one of (1) a tensile strength of about 2 MPa or higher and (2) a Young's modulus of about 100 MPa or higher.

2. The method of claim 1, wherein said second monomer comprises HEMA.

3. The method of claim 1, wherein said combination of monomers has a total concentration of about 38 wt % or less in said microemulsion.

4. The method of claim 1, wherein said second monomer has a concentration of from about 10 to about 25 wt % in said microemulsion.

5. The method of claim 1, wherein the concentration of said water in said microemulsion is from about 25 to about 50 wt %.

6. The method of claim 1, wherein the concentration of said surfactant in said microemulsion is from about 10 to about 50 wt %.

7. The method of claim 1, wherein said microemulsion further comprises a cross-linker.

8. The method of claim 7 wherein the cross-linker is ethylene glycol dimethacrylate (EGDMA).

9. The method of claim 1, wherein said microemulsion further comprises a polymerization initiator.

10. The method of claim 9, wherein said initiator is 2,2-dimethoxy-2-phenyl acetophenone (DMPA).

11. The method of claim 1, wherein said surfactant is a poly(ethylene oxide)-macromonomer.

12. The method of claim 11, wherein said surfactant is ω-methoxy poly(ethylene oxide)$_{40}$ undecyl α-methacrylate macromonomer.

13. A copolymer defining interconnected pores and comprising polymerized monomers and a surfactant copolymerized with one or more of said monomers, said monomers comprising
a first monomer more hydrophilic than 2-hydroxyethyl methacrylate (HEMA), comprising N-vinylpyrrolidone (NVP) or methacrylic acid (MAA); and
a second monomer as hydrophilic as, or less hydrophilic than, HEMA, comprising HEMA or methyl methacrylate (MMA),
wherein said surfactant and monomers and their respective weight ratios to said copolymer are chosen so that said copolymer has an equilibrium water content of about 76 wt % or higher, and has at least one of (1) a tensile strength of about 2 MPa or higher and (2) a Young's modulus of about 100 MPa or higher.

14. The copolymer of claim 13, wherein said second monomer comprises HEMA.

15. The copolymer of claim 13, wherein said pores have a pore diameter of about 10 to about 100 nm.

16. The copolymer of claim 13, wherein a weight ratio of said first monomer to said copolymer is about 0.15 to about 0.2.

17. The copolymer of claim 13, wherein a weight ratio of said second monomer to said copolymer is about 0.15 to about 0.2.

18. The copolymer of claim 13, wherein said copolymer has an oxygen permeability coefficient of from about 10 to about 30.

19. The copolymer of claim 13, wherein said copolymer has an oxygen permeability coefficient of about 26.

20. The copolymer of claim 13, wherein said surfactant is a poly(ethylene oxide)-macromonomer.

21. The copolymer of claim 13, wherein said surfactant is ω-methoxy poly(ethylene oxide)$_{40}$ undecyl α-methacrylate macromonomer.

22. The copolymer of claim 13, wherein said copolymer has a light transmission percentage of about 88% or higher.

23. The copolymer of claim 13, wherein said copolymer has a light transmission percentage of about 95% or higher.

24. The copolymer of claim 13, wherein said copolymer has a glucose diffusion permeability coefficient of about $2 \times 10^{-6}$ cm$^{-2}$/s or higher.

25. The copolymer of claim 13, wherein said copolymer has a glucose diffusion permeability coefficient of about $1 \times 10^{-6}$ to about $4 \times 10^{-6}$ cm$^{-2}$/s.

26. The copolymer of claim 13, wherein said copolymer has an albumin diffusion permeability coefficient of about $1.4 \times 10^{-7}$ cm$^{-2}$/s or higher.

27. The copolymer of claim 13, wherein said copolymer has an albumin diffusion permeability coefficient of from about $0.1 \times 10^{-6}$ to about $2 \times 10^{-6}$ cm$^{-2}$/s.

28. The copolymer of claim 13, wherein said copolymer has a tensile strength of about 2 MPa or higher.

29. The copolymer of claim 13, wherein said copolymer has a tensile strength of from about 1 to about 7 MPa.

30. The copolymer of claim 13, wherein said copolymer has a Young's modulus of about 100 MPa or higher.

31. The copolymer of claim 13, wherein said copolymer has a Young's modulus of about 90 to about 400 MPa.

32. A copolymer formed according to the method of claim 1.

* * * * *